No. 690,808. Patented Jan. 7, 1902.
G. T. WOODS.
METHOD OF CONTROLLING ELECTRIC MOTORS OR OTHER ELECTRICAL TRANSLATING DEVICES.
(Application filed Mar. 20, 1895.)

(No Model.)

Witnesses:
Samuel W. Balch
Wyatt Whitman

Inventor,
Granville T. Woods,
by Thomas Ewing Jr.,
Attorney

UNITED STATES PATENT OFFICE.

GRANVILLE T. WOODS, OF PARKRIDGE, NEW JERSEY, ASSIGNOR, BY MESNE ASSIGNMENTS, TO HARRY WARD LEONARD, OF EAST ORANGE, NEW JERSEY.

METHOD OF CONTROLLING ELECTRIC MOTORS OR OTHER ELECTRICAL TRANSLATING DEVICES.

SPECIFICATION forming part of Letters Patent No. 690,808, dated January 7, 1902.

Application filed March 20, 1895. Serial No. 542,457. (No model.)

*To all whom it may concern:*

Be it known that I, GRANVILLE T. WOODS, a citizen of the United States, residing at Parkridge, in the county of Bergen and State of New Jersey, (formerly residing at New York city, in the county and State of New York,) have invented certain new and useful Improvements in Methods of Controlling Electric Motors or other Electrical Translating Devices, of which the following is a specification.

This invention is an improvement over the method of regulation described in my application Serial No. 444,268, filed August 27, 1892; and my object is to provide a method of varying and reversing the electromotive force upon the terminals of the translating device.

The invention consists, broadly, in the method of regulating and controlling electric-power apparatus consisting in the employment of an electromotive force in series with the working motor or other translating device, the regulating electromotive force being capable of variation and reversal, so that it shall at pleasure be controlled both in amount and direction and in turn oppose the electromotive force supplied by the line in variable degree or add to it in variable degree. On the mechanical side the invention may be defined as the combination of an electric motor or other translating device and an electromotive-force regulator consisting of a dynamo-electric machine whose armature is in series with the motor or other translating device to be regulated and independent means for varying and reversing the electromotive force generated by the regulating-machine.

The accompanying drawings show two diagrammatic views illustrating my invention applied to the operation of a car and the circuit connections at different stages. While my invention is shown applied to the operation of a car, it will be understood that I do not limit myself to such application, as my improved method of control may be equally as well applied in the operation of other apparatus.

Figure 1:
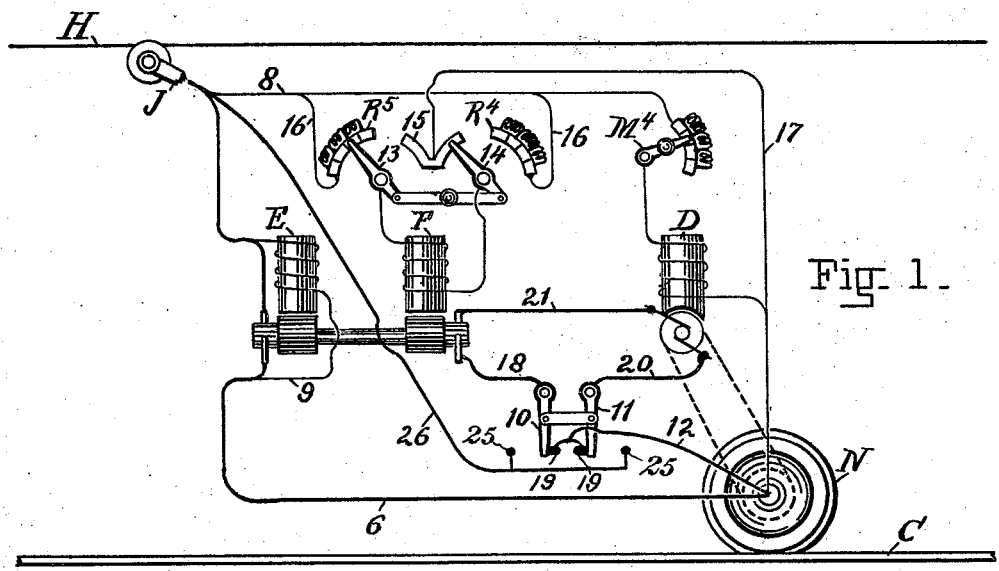

Referring to Figure 1 of the drawings, H indicates the overhead conductor of an electric railway; C, the rails which constitute the other side of the main circuit; D, the working motor for driving a car, and E and F two dynamo-electric machines by means of which the electromotive force at the terminals of the working motor is regulated and controlled. The machines D, E, and F are supplied with energy from the conductor H through the trolley J. The field-magnets of the machines D and F are connected in multiple-arc relation across the line, the connection of the field of machine D being from the trolley H by wire 8 through the coils of rheostat $M^4$ to wire 17 to the rails, and the connection of the field of machine F being from the trolley H by wires 8 and 16 through the coils $R^4$ and $R^5$ of the reversing rheostat and wire 17 to the rails. The armature of machine E is connected across the line from trolley H to the rails by wire 6, its field being in a shunt-circuit 9 relative to its armature. The armatures of the machines F and D are adapted under certain conditions to be in a local circuit 18 20 21 by means of switch-arms 10 11 and contacts 19 and under other conditions to be connected in series across the line from the trolley H by wire 26, contact 25 on the left, switch-arm 10, circuit 18, 21, and 20 to switch-arm 11 and a contact 19 to wire 12 and to the rails, or by wire 26, contact 25 on the right, switch-arm 11, circuit 20, 21, and 18 to switch-arm 10 and a contact 19 to wire 12 and to the rails. With the connections as in Fig. 1 machine E will run as a motor, driving machine F as a generator, which supplies energy to the working motor D. The speed of motor D can be varied by varying the field strength of machine F. By adjusting and reversing the field-rheostat of machine F without changing the position of switch-arms 10 and 11 the working motor can be operated in either direction from rest to one-half its full speed. The reversal of motion is especially smooth with connections as shown in Fig. 1, and when this is of importance the apparatus will preferably be so connected.

Figure 2:
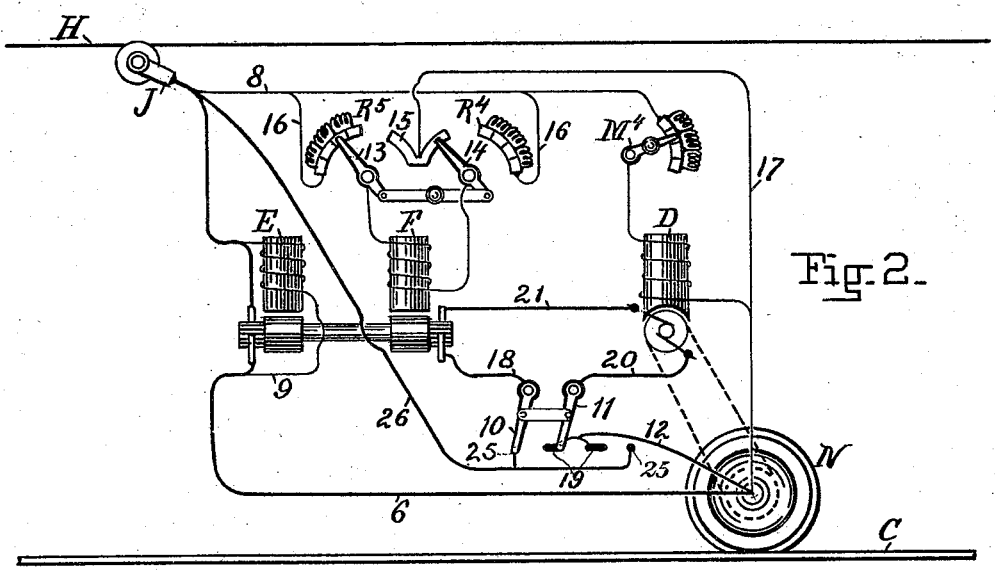

The connections of Fig. 1 will not be made where it is usual to operate the working motor at varying speeds from rest to full speed for the reason that the change in connections necessary to operate the motor at full speed are not readily obtained from the connections illustrated in Fig. 1. Ordinarily in starting the working motor the connections will be as shown in Fig. 2, with the arms 13 and 14 of the reversing-rheostat moved to the extreme left and with the full electromotive force of machine F opposed to the line electromotive force. Under these conditions there will be practically no electromotive force upon the terminals of the armature of the working motor. By gradually weakening the field of the machine F the electromotive force at the terminals of the armature of machine D will gradually increase, and when the machine F is producing practically no volts the working motor D will be working at half-speed, due to the line electromotive force. If now the field-magnetism of F is reversed by throwing the contact-levers 13 and 14 to the right onto the first contact of resistance $R^4$, machine F will produce a small electromotive force, which will assist the line electromotive force to drive the working motor, and by gradually strengthening the field of the machine F the speed of the working motor can be increased gradually to full speed. Thus it will be seen that the speed of the working motor will be due to the combined electromotive forces of the main source and machine F and that by this arrangement it will be possible to secure by means of a small current from the source a much larger current through the armature of the working motor or other translating device.

To reverse the direction of rotation of the working motor, the reversing-rheostat is first adjusted so that the full electromotive force of the machine F will oppose the line electromotive force, and hence there will be the minimum or practically no electromotive force upon the terminals of the armature of the working motor. The switch-arms 10 and 11 are then moved toward the right, opening the circuit 26 18 21 20 12, and then the field-switch of machine F is adjusted to bring the field of that machine to zero. The switch-arms 10 and 11 are then moved farther to the right, closing the local circuit 18 21 20 19, and the field-switch is then adjusted, so that the current from machine F will drive the working motor D in the desired direction, the speed of which may be increased up to the speed due to the full electromotive force of machine F. When in the middle position, the switch-arms 10 and 11 place the armatures of F and D in a local circuit of low resistance, which will be of benefit in stopping the moving load because of the action of D as a generator generating a large current in this local circuit.

If the working motor is operated with the connections, as shown in Fig. 1, and it is desired to increase its speed to full speed, switch-arms 10 and 11 are first moved to the left to the open-circuit position and then the field of F is adjusted, so that it will produce its full electromotive force in opposition to that of the line. The switch-arms 10 11 are then thrown to the left and the connections will be as in Fig. 2, and then by adjusting the field of machine F, as above described, the working motor will run at full speed. The rheostat $M^4$ in the field of the working motor is provided as an additional means of controlling its speed by varying the strength of the field of D, which will be of value in cases where the torque is low and it is desirable to reach very high speeds.

I do not claim herein the combination of apparatus and circuit connections employed in carrying out the method of my invention, since these features are made the subject of a divisional application filed the 28th day of March, 1901, Serial No. 53,213.

What I claim is—

1. The method of operating and regulating the work of an electric motor, consisting in partly supplying its armature from a constant potential source of electricity, and adding to or opposing the electromotive force supplied from the said constant potential source by varying and reversing the electromotive force of a supplementary source.

2. The method of operating and regulating the work of an electric motor, consisting in maintaining the field-magnet of the motor at a constant strength, partly supplying its armature from a constant potential source of electricity, and adding to or opposing the electromotive force supplied from the said constant potential source by varying and reversing the electromotive force of a supplementary source.

3. The method of regulating and controlling electric-power apparatus, consisting in supplying current to two electrodynamic machines whose armatures are in series with each other; and regulating one of the machines by driving the armature of the other machine at a constant speed and varying the field at will.

4. The method of regulating and controlling electric-power apparatus, consisting in supplying current to two electrodynamic machines whose armatures are in series with each other, and regulating the electromotive force of one of the machines, both in amount and direction, to control the other machine, by maintaining the speed and connections of the armature of the regulating-machine constant and varying and reversing its field.

5. The method of regulating and controlling electric-power apparatus, consisting in supplying current to two electrodynamic machines whose armatures are in series with each other, and regulating the electromotive force of one of the machines to control the other machine by driving the armature of the regulating-machine at a practically constant speed and varying its field and varying the field of the machine to be controlled.

6. The method of regulating and controlling electric-power apparatus, consisting in supplying current to two electrodynamic machines whose armatures are in series with each other, and regulating the electromotive force of one of the machines, both in amount and direction, to control the other machine, by maintaining the speed and connections of the armature of the regulating-machine practically constant and varying and reversing its field and varying the field of the other.

7. The method of regulating the electromotive force at the terminals of a translating device, consisting in so placing in the circuit, mechanically independent of the source, a dynamo-electric machine that by varying and reversing the electromotive force of said dynamo it will both assist and oppose the electromotive force of the source to vary the electromotive force at the terminals of the translating device.

8. The method of operating an electric motor at any desired speed from rest to full speed, which consists in operating a transformer of electric energy having one or more moving parts, which transformer receives electric energy in series with the motor and delivers electric energy in multiple with the motor, substantially as set forth.

9. The method of securing through the armature of a dynamo-electric machine by means of a small current from the source of supply, a much larger current, which consists in placing in electrical connection with the armature of the dynamo-electric machine a generator-winding and a motor-winding, which generator-winding supplies current to the said dynamo-electric machine.

Signed by me in New York city this 19th day of March, 1895.

GRANVILLE T. WOODS.

Witnesses:
SAMUEL W. BALCH,
EVERETT F. COUTANT.